June 23, 1953  B. WESTERFIELD  2,642,694

FISHING DEVICE

Filed Jan. 11, 1952

INVENTOR.
BEDFORD WESTERFIELD
BY
HIS ATTORNEY

Patented June 23, 1953

2,642,694

UNITED STATES PATENT OFFICE 2,642,694

FISHING DEVICE

Bedford Westerfield, Detroit, Mich.

Application January 11, 1952, Serial No. 266,040

4 Claims. (Cl. 43—35)

This invention relates to a fishing device to be used in conjunction with an ordinary barbed fish hook for still fishing or embodied in a lure, such as an artificial bait for casting or trolling.

It is an object of the present invention to provide a device, actuated by movement of the hook, to cause the latter to swing out of the path of normal movement for setting the hook.

Another object of the invention is to provide snap action means for swinging the barb end of the hook into cooperative relation with an auxiliary pointed member which has a piercing action on the fish to firmly lock the fish against removal from the barb.

A further object of the invention is to provide a resilient device, operable in conjunction with the fish hook, which may be set in a tensioned position and sprung by the movement of the hook.

Other objects and advantages of the invention will more fully appear from the following description taken in connection with the accompanying drawings, in which.

Figure 1:
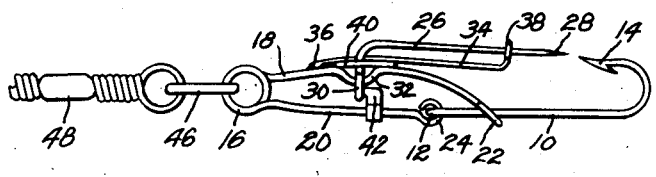
Fig. 1 is a side elevational view of the improved device, illustrating the parts and hook in the set position.

Referring to the drawings, I have shown a conventional fish hook having a shank 10, eye 12 and barbed point 14. The hook is carried by a spring actuated device formed from spring steel wire bent to form a coil 16 with the opposite ends of the coil projecting away from the coil as arms 18 and 20. The outer end of the arm 18 is provided with an eye 22 formed by reversely bending the end of the wire into a loop. The barb 14 of the hook is threaded through the eye 22 and the shank 10 is slidably mounted in the eye 22. The eye 12 of the hook is received in an eye 24 at the outer end of the arm 20. The arm 18 is longer than the arm 20 so that the eye 22 forms a guide for the shank 10 of the hook.

A needle member 26, having a pointed end 28 is loosely mounted on the arm 18 by forming an eye 30 in the opposite end of the needle member 26 which surrounds a U shaped portion 32 of the arm 18, substantially midway between the outer end of the arm 18 and the coil 16. The eye end 30 of the needle 26 is bent at right angles to the main body of the needle so that, when assembled, the needle body extends substantially parallel to the arm 18 and the pointed end 28 extends outwardly beyond the eye 22 of the arm 18. As a means for retaining the needle in the aforesaid position, I have provided a resilient arm 34, having one end attached to the arm 18, as at 36, and a loop eye 38 at its opposite outer end surrounds the body of the needle 26. An apertured guide member 40, bridging the U shaped portion 32 of the arm 18, further positions the needle with respect to the arm 18, the bridge 40 being secured to the arm 18.

The eye 30 of the needle 26 is sufficiently larger in diameter than the diameter of the arm 18 so that there is room within the eye 36 to receive a locking member in addition to the arm 18. This locking member is shown as a stamping 42 secured to the arm 20 at a point longitudinally thereof from the coil 16, a distance substantially equal to the distance between the eye 30 and the coil 16. The stamping 42 is provided with a hook portion 44 adapted to catch within the eye 30. The eye 30 and hook 44, when engaged in the eye, retain the arm 18 and arm 20 in close side by side position, as shown in Fig. 1.

The resilient arm 34, in addition to retaining the needle 26 parallel to the arm 18, exerts an outward pressure on the needle 26, maintaining the eye 30 in a locked position over the hook 44. The resilient arm 34 is preferably made of lighter material than the arm 18, arm 20 and coil 16, so that the resistance of its spring action is more readily overcome by deflection. The needle 26 and eye 30 are pivotally supported in the apertured bridge 40 and the outer end of the needle 26 may be considered as a trigger for releasing the hook 44.

Figure 2:
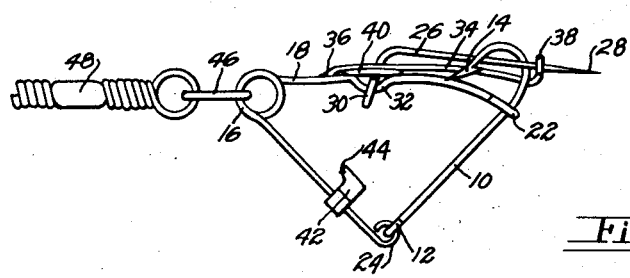
Fig. 2 is a view corresponding to Fig. 1 but showing the parts in sprung position.

In the operation of the device, the arms 18 and 20 are forced into close relation and the hook 44 is positioned into engagement with the eye 30, the resilient arm 34 maintaining the hook and eye in the locked position. When a fish strikes the barbed end of the fish hook, the bite causes the outer end of the needle 26 to be moved toward the hook shank 10, moving the eye 30 out of engagement with the hook 44, thereby permitting the stressed spring energy in the coil 16 to force the arms 18 and 20 apart, as illustrated in Fig. 2. As the arms 18 and 20 are separated, the arm 20 draws the shank 10 of the fish hook through the eye 22 and sets the barbed end 14 in the fish's mouth. If there is slack in the line the pointed end 28 of the needle pierces the outer portion of the mouth, thereby providing an inner and outer lock on the fish so that it is practically impossible for the fish to shake the barbed hook out of its mouth.

A ring 46 is attached to the coil 16 and a swivel 48, to which the fish line is attached, serves as a leader for the improved fishing device.

Figure 3:
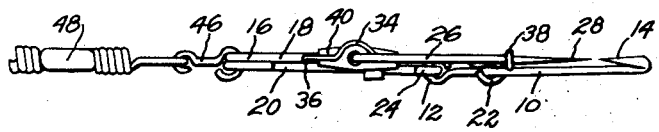
Fig. 3 is a top plan view of Fig. 1.
Figure 4:
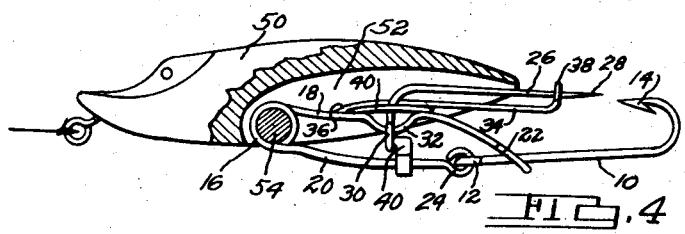
Fig. 4 is a side elevational view of the device as applied to a lure, such as an artificial minnow, the latter being broken away and partly shown in cross section.

Referring to Fig. 4, I have shown the device, illustrated in Figs. 1, 2 and 3, applied to a lure 50. If it is desired to apply the device to a lure, such as an artificial minnow, a groove 52 may be provided in the lure and a pin 54 inserted through the coil 16. The action of the device is the same whether used as illustrated in Fig. 1 or attached to a lure, as shown in Fig. 4. The device is easily connected to an ordinary fish line and may be used with any type of fishing bait. It is easily set and will be sprung automatically after a fish has once depressed the needle trigger 26.

While the device has been illustrated and described in one embodiment, it will be understood that various changes including the size, shape and arrangements of parts may be made without departing from the spirit of my invention and it is not my invention to limit its scope other than by the terms of the appended claims.

I claim:

1. A fishing device comprising, a coiled spring member having a coil portion and a pair of arms extending outwardly from said coil portion, a fish hook having an eye, a shank and a barb, the eye of the hook being loosely secured to the outer end of one of said arms, an eye on the outer end of the other arm through which the shank of the fish hook is freely slidable, said second named arm being longer than said first named arm, a trigger arm having an eye loosely surrounding said second named arm and having its body portion extending outwardly in the direction of the outer end of said second named arm, resilient positioning means for said trigger arm, and a releasable latching means between said first named arm said trigger arm.

2. A fishing device comprising, a coiled wire spring member having a coil portion and a pair of arms extending outwardly from said coil portion, a fish hook having an eye, a shank and a barb, the eye of the hook being loosely secured to the outer end of one of said arms, an eye on the outer end of the other arm through which the shank of the fish hook is freely slidable, a trigger arm having a pointed outer end extending outwardly beyond the outer end of said second named arm and an eye carried by said second name arm, and a releasable latching means between one of said arms and said trigger arm.

3. A fishing device comprising, a coiled spring member having a coil portion and a pair of arms extending outwardly from said coil portion, a fish hook having an eye, a shank and a barb, the eye of the hook being loosely secured to the outer end of one of said arms, an eye on the outer end of the other arm through which the shank of the hook is freely slidable, said second named arm being longer than said first named arm, a trigger arm having an eye loosely surrounding said second named arm and having its body portion extending outwardly in the direction of the outer end of said second named arm, said trigger arm being pivotally supported on said second named arm, resilient positioning means for said trigger arm, and a hooked member on said first named arm for releasable engagement with the eye of said trigger arm when said arms are forced toward each other.

4. A flushing device comprising, a pair of resilient arms connected together at one point and normally urged in opposite directions, at other points one arm being longer than the other, a fish hook having an eye, a shank portion, and a barb, the eye of said hook being loosely connected to the outer free end of the shorter of said arms, the outer free end of the longer of said arms forming a guide for the shank of the fish hook, means cooperating between said arms for holding said arms in close side by side relation, and means carried by one of said arms in close proximity to the barbed end of said fish hook for releasing said holding means.

BEDFORD WESTERFIELD.

No references cited.